(12) United States Patent
Katariya et al.

(10) Patent No.: US 6,789,230 B2
(45) Date of Patent: Sep. 7, 2004

(54) CREATING A SUMMARY HAVING SENTENCES WITH THE HIGHEST WEIGHT, AND LOWEST LENGTH

(75) Inventors: Sanjeev Katariya, Issaquah, WA (US); William P. Jones, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/216,097

(22) Filed: Dec. 18, 1998

(65) Prior Publication Data

US 2003/0079185 A1 Apr. 24, 2003

Related U.S. Application Data

(60) Provisional application No. 60/103,740, filed on Oct. 9, 1998.

(51) Int. Cl.$^7$ .............................................. G06F 7/00
(52) U.S. Cl. ..................... 715/531; 715/500; 715/530
(58) Field of Search ............................. 707/530, 531, 707/500; 715/500, 530, 531

(56) References Cited

U.S. PATENT DOCUMENTS

| | | | | |
|---|---|---|---|---|
| 5,848,191 A | * | 12/1998 | Chen et al. ................ | 382/176 |
| 5,918,240 A | * | 6/1999 | Kupiec et al. ............. | 707/531 |
| 5,924,108 A | * | 7/1999 | Fein et al. .................. | 707/531 |
| 6,104,990 A | * | 8/2000 | Chaney et al. ............. | 704/9 |
| 6,185,592 B1 | * | 2/2001 | Boguraev et al. .......... | 704/9 |
| 6,205,456 B1 | * | 3/2001 | Nakao ......................... | 707/3 |
| 6,338,034 B1 | * | 1/2002 | Ishikawa et al. ........... | 704/9 |
| 6,353,824 B1 | * | 3/2002 | Boguraev et al. .......... | 704/9 |
| 6,401,086 B1 | * | 6/2002 | Bruckner .................... | 707/3 |
| 6,424,362 B1 | * | 7/2002 | Bornstein et al. .......... | 345/854 |

OTHER PUBLICATIONS

Kupiec et al, "A trainable document summarizer", Proceedings of the 18th annual international ACM SIGIR conference on Research and development in information retrieval 1995, pp. 68–73.*

* cited by examiner

*Primary Examiner*—Stephen S. Hong
*Assistant Examiner*—Cesar B Paula
(74) *Attorney, Agent, or Firm*—Woodcock Washburn LLP

(57) ABSTRACT

A method and system for generating a summary of a document. The summary generating system generates the summary from the sentences that form the document. The summary generating system calculates a weight for each of the sentences in the document. The weight indicates the importance of the sentence to the document. The summary generating system then selects sentences based on their calculated weights. The summary generating system creates a summary of the selected sentences such that selected sentences are ordered in the created summary in the same relative order as in the document. In one embodiment, the summary generating system identifies sets of sentences whose total length of the sentences in the set is less than a maximum length. The summary generating system then selects an identified set of sentences whose total of the calculated weights of the sentences is greatest as the generated summary. The length of a sentence may be measured in characters or words. In an alternate embodiment, the summary generating system selects the sentences with the highest calculated weights whose total length of the selected sentences is less than a maximum length as the summary.

31 Claims, 3 Drawing Sheets

US 6,789,230 B2

CREATING A SUMMARY HAVING SENTENCES WITH THE HIGHEST WEIGHT, AND LOWEST LENGTH

CROSS-REFERENCE TO RELATED APPLICATION

This application claims the benefit of pending U.S. Provisional Application No. 60/103,740, filed Oct. 9, 1998, which application is incorporated by reference in its entirety.

TECHNICAL FIELD

This invention relates generally to a computer system for document processing, and more specifically for generating a summary of a document.

BACKGROUND OF THE INVENTION

The Internet is a collection of interconnected computer systems through which users can access a vast store of information. The information accessible through the Internet is stored in electronic files (i.e., documents) under control of the interconnected computer systems. It has been estimated that over 50 million documents are currently accessible through the Internet and that the number of documents is growing at the rate of 75% per year. Although a wealth of information is stored in these documents, it has been very difficult for users to locate documents relating to a subject of interest. The difficulty arises because documents are stored in many different computer systems, and the Internet provides no central mechanism for registering documents. Thus, a user may not even know of the existence of certain documents, let alone the subject matter of the documents. Each document that is accessible through the Internet is assigned a unique identifier, which is referred to as a uniform resource locator ("URL"). Once a user knows the identifier of a document, the user can access the document. However, even if a user knows the identifiers of all documents accessible through the Internet, the user may not know the subject matter of the document. Thus, the user may have no practical way to locate a document relating to a subject of interest.

Several search engines have been developed to assist users to locate documents relating to a subject of interest. Search engines attempt to locate and index as many of the documents provided by as many computer systems of the Internet as possible. The search engines index the documents by mapping terms that represent the subject matter of each document to the identifier of the document. For example, if a search engine determines that the terms "united" and "states" represent the subject matter of a document, then the search engine would map each of those terms to the URL for the document. When using a search engine to locate documents relating to a subject of interest, the user enters search terms that describe the subject of interest. The search engine then searches the index to identify those documents that are most relevant to the search terms. For example, if a user enters the search terms "united" and "states," then the search engine searches the index to identify the documents that are most relevant to those search terms. In addition, the search engine may present the search results, that is the list of relevant documents, to the user in order based on the relevance to the search term. The user can then select and display the most relevant documents.

The accuracy of the search results depends upon the accuracy of the indexing used by a search engine. Unfortunately, there is no easy way for a search engine to determine accurately the subject matter of documents. The difficulty in determining the subject matter of a document is compounded by the wide variety of formats (e.g., as a word processing documents or as a hyper-text document) and the complexity of the formats of the documents accessible through the Internet. To make it easier for a search engine to determine the subject matter of a document, some document formats have a "keyword" section that provides words that are representative of the subject matter of the document. Unfortunately, creators of documents often fill the "keyword" section with words that do not accurately represent the subject matter of the document using what is referred to as "false promoting" or "spamming." For example, a creator of a classified advertising web page for automobiles that may fill the "keyword" section with repetitions of the word "car." The creator does this so that a search engine will identify that web page as very relevant whenever a user searches for the term "car." However, a "keyword" section that more accurately represents the subject matter of the web page may include the words "automobile," "car," "classified," "for," and "sale."

Because the document formats have no reliable way to identify the subject matter of a document, search engines use various algorithms to determine the actual subject matter of documents. Such algorithms may generate a numerical value for each term in a document that rates importance of the term within the document. For example, if the term "car" occurs in a document more times than any other term, then the algorithm may give a high numerical value to the term "car" for that document. Typical algorithms used to rate the importance of a term within a document often factor in not only the frequency of the occurrence of term within the document, but also the number of documents that contain that term. For example, if a term occurs two times in a certain document and also occurs in many other documents, then the importance of that term to the document may be relatively low. However, if the term occurs two times in that document, but occurs in no other documents, then the importance of that term within the document may be relatively high even though the term occurs only two times in the document. In general, these algorithms attempt to provide a high "information score" to the terms that best represent the subject matter of a document with respect to both the document itself and to the collection of documents.

To calculate the importance or "information score," typical algorithms take into consideration what is referred to as the term frequency within a document and the document frequency. The term frequency of a term is the number of times that the term occurs in the document. The term frequency for term i within document j is represented as $TF_{ij}$. The document frequency of a term is the number of documents in which the term occurs. The document frequency for term i is represented as $n_i$. One such algorithm uses the Salton Buckley formula for calculating the importance of terms. The formula is given by the following equation:

$$W_{ij} = \log_2 TF_{ij} * \log_2 \frac{N}{n_i} \quad (1)$$

where $W_{ij}$ is the numerical value (i.e., weight) of the importance of the term i to the document j, where $TF_{ij}$ is the term frequency, where $n_i$ is the document frequency, and where N is the total number of documents in a collection of documents. The quotient $N/n_i$ is referred to as the inverse document frequency, which is the inverse of the ratio of the number of documents that contain the term to the total number of documents. As the term frequency increases, the weight calculated by this formula increases logarithmically.

That is, as the term occurs more frequently in a document, the weight of that term within the document increases. Also, as the document frequency increases, the weight decreases logarithmically. That is, as a term occurs in more documents, the weight of the term decreases. It is, of course, desirable to use a formula that results in weights that most accurately reflect the importance or information score of terms.

Search engines typically identify and index only single terms. Search engines, however, do not typically index phrases, which are sequences of two or more terms. For example, a search engine may index the terms that comprise the phrase "United States," separately. Thus, when a user wants to locate documents related to the "United States," the search engine may locate many documents that contain the terms "united" and states," but that do not contain the phrase "United States." As a result, the search engine may locate many documents that are of no interest to the user. For example, the search engine may locate documents that contain the sentence: "He then states that united we stand." Moreover, even if a search engine could index phrases, the search engines would calculate the importance of a phrase in a manner that is analogous the calculation of the importance of a term. That is, the search engines would treat the phrase as a single term and would use the formula as shown in equation (1) to calculate the weight of the phrase. However, such treatment of phrases is impractical for large collections of documents with a large number of unique terms. In particular, since the number of possible phrases increases exponentially with the length of the phrase, the number of frequencies that would need to be determined and stored for each document would also increase exponentially. Thus, it would be desirable to have a technique to calculate the importance of a phrase in a way that avoids this increase in storing.

As described above, the search engine presents the search results, that is the list of relevant documents, to the user. The relevance of a document is determined by the particular algorithm used by the search engine. Once a user is presented with documents, the user typically still needs to ensure that each document actually relates to the subject of interest. To determine whether a document is actually related to the subject of interest, a user may open and read through the document. However, the opening and reading of the various documents identified by the search engine can be very time consuming but very necessary. As described above, the "keyword" section of a document may not accurately represent the subject matter of the document. Similarly, the creator of a document may fill the abstract or first couple sentences of a document with words that do not accurately represent the subject matter of the document. Thus, it would be desirable to have a technique by which a user could determine the relevance of a document without opening and reading through the document.

SUMMARY OF THE INVENTION

An embodiment of the present invention provides a method and system for generating a summary of a document. The summary generating system generates the summary from the sentences that form the document. The summary generating system calculates a weight for each of the sentences in the document. The weight indicates the importance of the sentence to the document. The summary generating system then selects sentences based on their calculated weights. The summary generating system creates a summary of the selected sentences such that selected sentences are ordered in the created summary in the same relative order as in the document. In one embodiment, the summary generating system identifies sets of sentences whose total length of the sentences in the set is less than a maximum length. The summary generating system then selects an identified set of sentences whose total of the calculated weights of the sentences is greatest as the generated summary. The length of a sentence may be measured in characters or words. In an alternate embodiment, the summary generating system selects the sentences with the highest calculated weights whose total length of the selected sentences is less than a maximum length as the summary.

DETAILED DESCRIPTION OF THE INVENTION

An embodiment of the present invention provides a method and system for automatically generating a summary of a document. The summary generating system generates the summary based on the weights of the sentences of the document. In one embodiment, the summary generating system identifies sets of sentences whose overall length is less than a predefined length. The sentences of each identified set are not necessarily contiguous sentences of the document. The summary generating system then selects the identified set of sentences whose total weight is greatest. The summary generating system then forms the summary from the sentences of the selected set keeping the same relative ordering of the sentences as they occur in the document. The length of each sentence and the predefined length of the summary may be measured as characters or terms (e.g., words). In an alternate embodiment, the summary generating system selects for the summary those sentences of the document whose weights are highest and whose overall length is less than a predefined length.

The generated summaries of documents can be used to accurately represent the subject matter of a document. The accuracy of the summary depends upon the accuracy of the algorithm used to weight the sentences. In one embodiment, the summary generating system uses weighting algorithms described in U.S. patent application No. 6,473,753B1, entitled "Method and System for Calculating Term-Document Importance," and U.S. patent application No. 6,549,897B1, entitled "Method and System for Calculating Phrase-Document Importance," which are being filed concurrently and which are hereby incorporated by reference.

Figure 1:
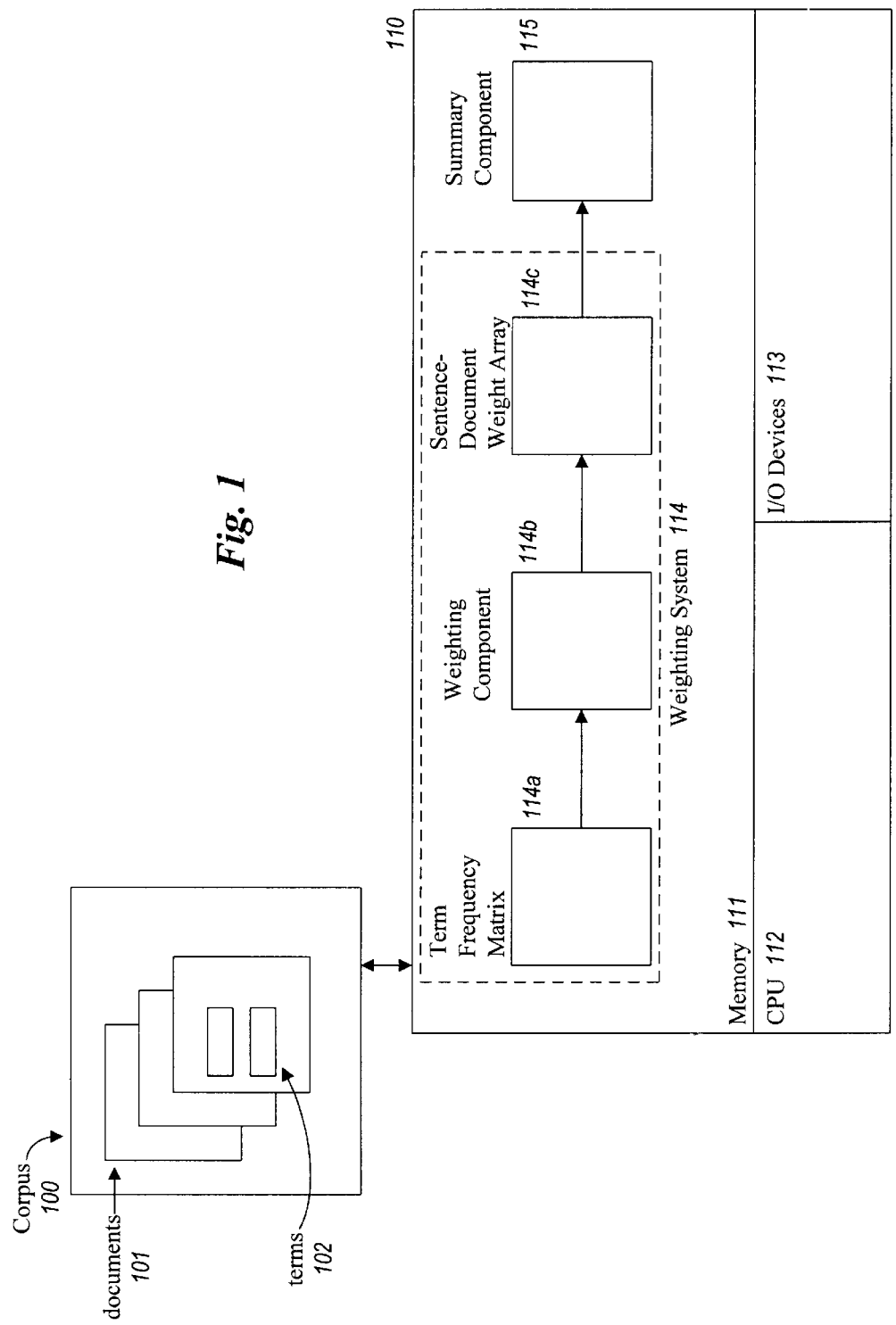
FIG. 1 is a block diagram of a computer system for executing the summary generating system.

FIG. 1 is a block diagram of a computer system for executing the summary generating system. The computer system 110 includes a memory 111, central processing unit 112, and various I/O devices 113. The input/output devices may include a monitor, keyboard, and storage devices. The storage devices may include a disk, a CD-ROM, or other computer-readable media. The computer system 110 can access the corpus 100 of documents that may be contained on a storage device directly connected to the computer or on storage devices of other computer systems. The corpus contains documents 101 and each document comprises one or more terms 102. The summary generating system includes a weighting system 114 and a summary component 115. The weighting system comprises a term frequency matrix 114a, a weighting component 114b, and a sentence-document weight array 114c. The term frequency matrix maps each term to the number of times that it occurs in each document. Thus, the number of rows in the term frequency matrix is equal to the number of unique terms ("M") in the corpus, and the number of columns in the matrix is equal to the number of documents ("N") in the corpus. The term frequency matrix can be pre-generated or generated by the weighting system by searching through the corpus. The weighting component determines the sentence-document importance (weight) of sentences within documents. The weighting component inputs the term frequency matrix and generates the sentence-document weight array for a document. The sentence-document weight array for a document has a row for each sentence in a document. The sentence-document weight array contains the sentence-document weight for the sentences within the document. The summary component inputs the sentence-document weight array for a sentence, generates a summary based on the weights, and outputs the generated summary.

The weighting component may be invoked multiple times to generate summaries for various documents. The weighting component calculates the weight of sentences based on the term frequency of the component terms (e.g., word) of the sentence. The weighting component preferably disregards certain component terms when calculating the weight of a sentence. In particular, the weighting component disregards noise words, such as "a" and "the." More generally, the weighting component disregards terms that may be so common throughout the corpus that the terms do not help to distinguish the subject matter of one document from another. In one embodiment, the weighting component treats a sentence as a phrase comprising the component terms of the sentence when calculating the weight of the sentence. Techniques for calculating a weight for a phrase and a sentence are described in U.S. patent application No. 6,549,897B1, entitled "Method and System for Calculating Phrase-Document Importance." In one embodiment, the weighting component may calculate a weight for a certain number or certain length of sentences in a document, rather than for all sentences in the document. For example, the weighting component may only calculate the weight of the first 25 sentences in a document or of the sentences that comprise the first 250 words or 1000 characters. The sentences that may form the summary, referred to as eligible sentences, are those sentences whose weights are calculated by the weighting component.

Figure 2:
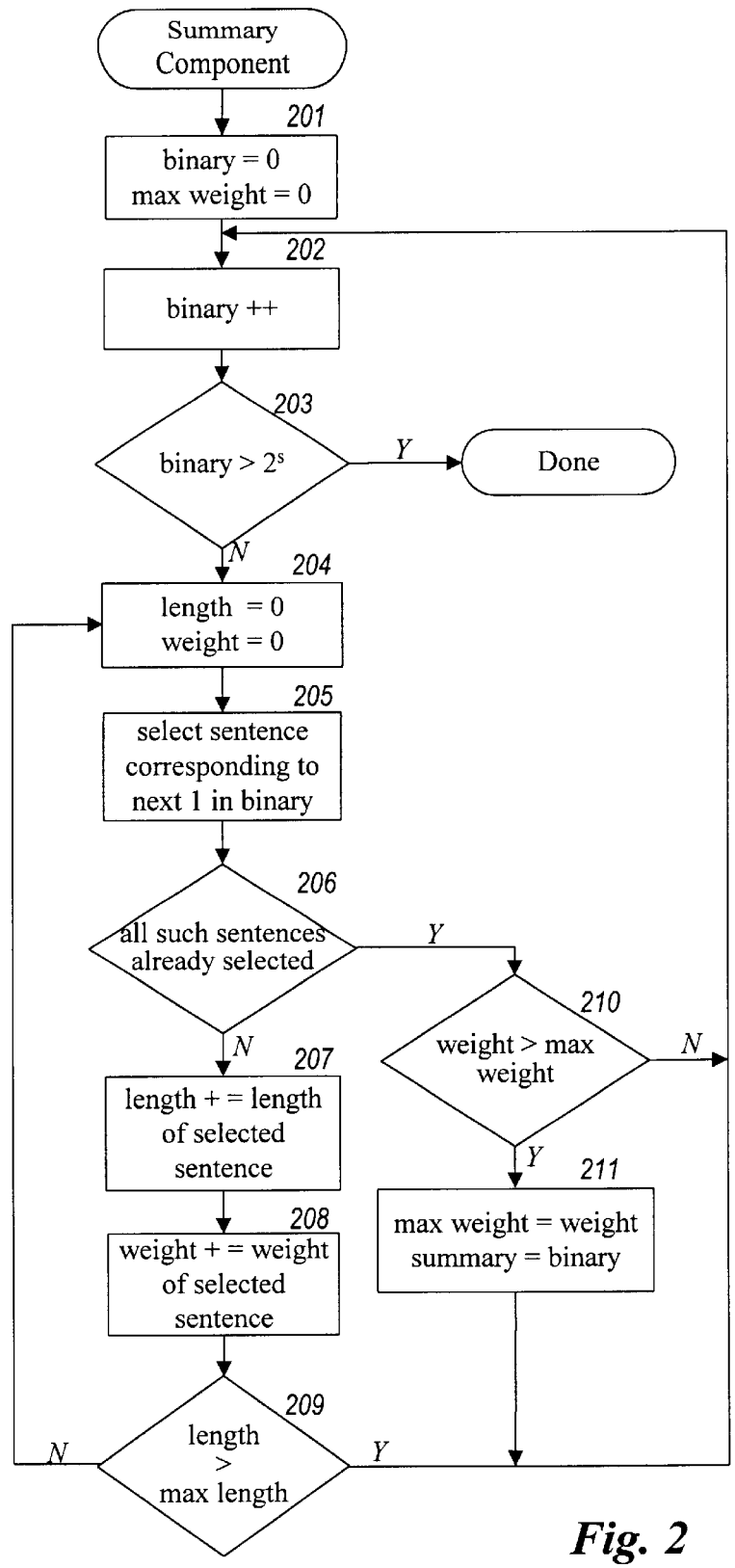
FIG. 2 is a flow diagram of an embodiment of the summary component.

FIG. 2 is a flow diagram of an embodiment of the summary component. The summary component evaluates each possible set of eligible sentences and selects that set of sentences whose length is less than the maximum length for the summary and whose total weight of the sentences in the set is greatest. The possible sets of sentences can be represented by a binary representation where each bit in the binary representation represents an eligible sentence in the document. Each possible set of sentences is represented by a different binary value. For example, if the document contains six eligible sentences, then the binary representation "101011" represents a set comprising the first, the third, the fifth, and the sixth sentences of the document. The possible number of sets are $2^s-1$ where S is the number of eligible sentences in the document. Thus, for a document that contains six eligible sentences, the number of possible sets of sentences is 63. Upon completion, the summary component outputs a binary representation representing the sentences that comprise the generated summary.

In step 201, the component initializes the binary representation to all zeroes and the maximum weight calculated for a set to zero. The variable binary contains a bit for each eligible sentence in the document. The variable max weight is used to track the highest weight of the sets of sentences processed so far. In steps 202–211, the component loops, selecting each possible set of sentences, calculating the weight of the sets, and the length of the sets. In step 202, the component increments the binary representation. That is, the value of the binary representation will vary from 1 to $2^s-1$. In step 203, if the binary representation is greater than $2^s$, then the component has processed all the possible sets and the component completes, else the component continues at step 204. In step 204, the component initializes the variable length to zero and the variable weight to zero. The component uses the variable length to calculate the length of the sentences in the set and the variable weight to total the weight of the sentences in the set. In steps 205–209, the component loops selecting each sentence in the set and calculating the length and weight of the set. In step 205, the component selects the sentence corresponding to the next "1" in the binary representation starting with the first. In step 206, if all such sentences have already been selected, then the component continues at step 210, else the component continues at step 207. In step 207, the component increases the variable length by the length (e.g., number of words or characters) of the selected sentence. In step 204, the component increments the variable weight by the weight of the selected sentence as indicated by the sentence-document weight array. In step 209, if the variable length is greater than the maximum length, then the component disregards the set represented by the variable binary and loops to step 202 to select the next set, else the component loops to step 205 to select the next sentence in the set. In step 210, if the weight of the sentences in the set is greater than the maximum weight of a set to process so far, then a new set with a higher weight and with a length less than the maximum length has been processed and the component continues at step 211, else the component loops to step 202 to select the next set. In step 211, the component sets the variable max weight equal to the weight of the set represented by the variable binary and stores the variable binary in the variable summary and loops to step 202 to select the next set. Upon completion, the variable summary contains the binary representation of the set of sentences with the highest weight. One skilled in the art will appreciate that processing by this component may be optimized to disregard sets of sentences whose subsets have already been processed and found to exceed the maximum length. For example, if the maximum length is 100 words and the third sentence contains 101 words, then the component can disregard any set that contains the third sentence.

TABLE 1

| Sentence ID | Sentence Weight | Sentence Length (characters) |
|---|---|---|
| 1 | 10 | 34 |
| 2 | 100 | 42 |
| 3 | 370 | 30 |
| 4 | 700 | 50 |
| 5 | 340 | 20 |
| 6 | 900 | 49 |

Table 1 represents a sentence-document weight array for a sample document. The sample document contains 6 eligible sentences. The third sentence (i.e., sentence ID=3) in the document has a weight of 370 and contains 30 words. Table 2 represents weights and length of sets whose total length is less than 100 characters, which is the maximum length of the summary. All sets of sentences not represented in Table 2 have a length greater than 100. For example, since the set comprising sentences 1, 2, and 3 has a length of 106 characters, that set is not represented in the table. In this example, the set of sentences 3, 5, and 6 has the highest weight (i.e., 1610) and is thus selected as the summary. The binary representation for such a set is "001011."

TABLE 2

| Set   | Total Weight | Total Length |
|-------|--------------|--------------|
| 1     | 10           | 34           |
| 1 2   | 110          | 76           |
| 1 2 5 | 450          | 96           |
| 1 3   | 380          | 64           |
| 1 3 5 | 720          | 84           |
| 1 4   | 710          | 84           |
| 1 5   | 350          | 54           |
| 1 6   | 910          | 83           |
| 2     | 100          | 42           |
| 2 3   | 470          | 72           |
| 2 3 5 | 810          | 92           |
| 2 4   | 800          | 92           |
| 2 5   | 440          | 62           |
| 2 6   | 1000         | 91           |
| 3     | 370          | 30           |
| 3 4   | 1070         | 80           |
| 3 4 5 | 1410         | 100          |
| 3 5   | 710          | 50           |
| 3 5 6 | 1610         | 99           |
| 4     | 700          | 50           |
| 4 5   | 1040         | 70           |
| 4 6   | 1600         | 99           |
| 5     | 340          | 20           |
| 5 6   | 1240         | 69           |
| 6     | 900          | 49           |

Figure 3:
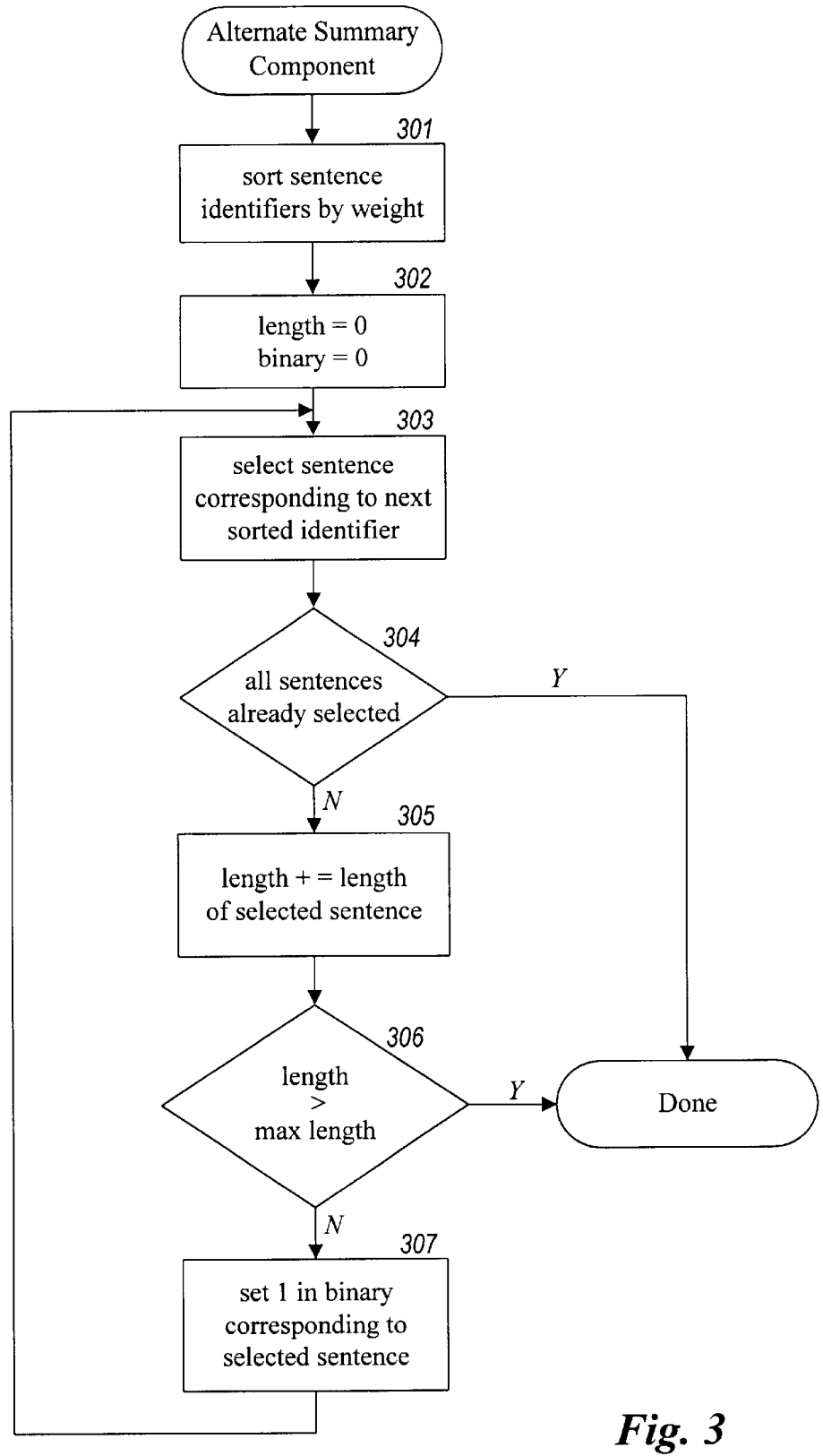
FIG. 3 is a flow diagram of an alternate summary component.

FIG. 3 is a flow diagram of an alternate summary component. This alternate summary component orders identifiers of the sentences by the weights of the sentences they identify and selects sentences in order based on their weights to form the summary. In step 301, the component sorts the sentence identifiers by the weights of the sentences. In step 302, the component initializes a variable length and variable binary to zero. In steps 303–307, the component loops selecting the sentences in order based on their weight. In step 303, the component selects the sentence corresponding to the next sorted sentence identifier. In step 304, if all the sentences have already selected, then the component completes, else the component continues at step 305. In step 305, the component increases the variable length by the length (e.g., number of characters or words) of the selected sentence. In step 306, if the variable length is greater than the maximum length, then the component completes, else the component continues at step 307. In step 307, the component sets a "1" in the variable binary corresponding to the selected sentence and loops to step 303 to select the next sentence. Upon completion, the variable binary will represent the sentences selected for summary. This summary component stops processing the sentences as soon as the next highest weighted sentence has a length that would cause the summary to exceed the maximum length. Alternatively, this summary component could process each sentence in order and continue to add sentences to the summary so long as the maximum length is not exceeded, that is, shorter sentences with lower weights are added to the summary.

The alternate summary component of FIG. 3 may generate different summaries than the summary component of FIG. 2. For example, this alternate summary component will generate a summary for the example of Tables 1 and 2 that contains sentences 4 and 6, rather than sentences 3, 5, and 6. This alternate summary component will first select the highest weighted sentence, sentence 6, and then the second highest weighted sentence, sentence 4. Since the next highest weighted sentence, sentence 3, would cause the total length to exceed the maximum length of 100, sentences 4 and 6 are selected as the summary.

The summary component may store the sentences of the summary in a string-valued property of the document, referred to as "SmartSummary." The string-valued property may include ellipses to indicated sentences that were not selected as part of the summary. Alternatively, the summary can be represented by the binary representation of the set of sentences selected for the summary. Also, the weight of a sentence may be calculated by adding the weights of the component terms of the sentence.

Although the present invention has been described in terms of various embodiments, it is not intended that the invention be limited to these embodiments. Modifications within the spirit of the invention will be apparent to those skilled in the art. The scope of the present invention is defined by the claims that follow.

What is claimed is:

1. A method in a computer system for generating a summary of a document, the document having sentences, the sentences being ordered, the method comprising:

providing a weight for each of a plurality of the sentences, the weight indicating importance of the sentence to the document;

identifying sets of the plurality of the sentences;

identifying a total length of the plurality of sentences in each identified set;

identifying a total of the provided weights of the plurality of sentences in each identified set;

selecting one of the identified sets of the plurality of the sentences, wherein the selected set has a greatest total of the provided weights of all identified sets having a total length less than a predefined length; and creating a summary from the plurality of the sentences in the selected set.

2. The method of claim 1 wherein the length is measured in words.

3. The method of claim 1 wherein the length is measured in characters.

4. The method of claim 1 wherein the created summary comprises an indication of sentences of the document that are omitted from the selected sentences.

5. The method of claim 4 wherein the indication of sentences of the document that are omitted is an ellipses.

6. A method in a computer system for generating a summary of a document, the document having sentences, the sentences being ordered, the method comprising:

providing a weight for each of a plurality of the sentences, the weight indicating importance of the sentence to the document;

identifying sets of the plurality of sentences;

identifying a total length for the plurality of sentences in each identified set;

identifying a total of the provided weights of the plurality of sentences in each identified set;

selecting one of the identified sets of the plurality of the sentences, wherein the selected set has a greatest total of the provided weights of all identified sets having a total length less than a predefined length; and creating a summary from the plurality of the sentences in the selected set, wherein the plurality of sentences in the selected set are ordered in the created summary in the same relative order as the plurality of sentences in the selected set appear in the document.

7. The method of claim 6 wherein the length is measured in words.

8. The method of claim 6 wherein the length is measured in characters.

9. The method of claim 1 wherein the providing of the weights includes calculating the weight of each sentence based on term frequencies of terms in the sentence.

10. The method of claim 1 wherein the created summary is stored as a property of the document.

11. The method of claim 6 wherein the created summary is stored as a binary representation.

12. The method of claim 1 wherein the document is one of a plurality of documents, wherein the sentence has component terms, and wherein the providing of the weight of a sentence includes:
   estimating a number of the plurality of documents that contain the sentence based on term frequencies of the component terms, a term frequency of a term being a number of occurrences of that term in a document;
   estimating a total number of times the sentence occurs in the plurality of documents based on the term frequencies of the component terms; and
   combining the estimated number of documents that contain the sentence and the estimated total number of times that the sentence occurs in the plurality of documents to generate the weight for the sentence.

13. The method of claim 1 wherein the document is one of a plurality of documents, wherein each document comprises terms, wherein each sentence comprises component terms, and wherein the providing of a weight of a sentence includes:
   for each term, providing a term frequency that represents the number of occurrences of that term in the plurality of documents;
   estimating a document frequency for the sentence based on an estimated sentence probability of the sentence, the document frequency being the number of the plurality of the documents that contain the sentence, the estimated sentence probability being an estimation of the probability that any sentence in documents that contain each component term is the sentence, the sentence probability being derived from term probabilities of the component terms, the term probability of a component term being a ratio of an average of the provided term frequencies for the component terms per document that contains that component term to an average number of terms per document;
   estimating a total sentence frequency for the sentence based on an average sentence frequency for the sentence times the estimated document frequency for the sentence, the average sentence frequency being derived from the sentence probability of the sentence and the average number of terms per document; and
   combining the estimated document frequency with the estimated total sentence frequency to generate the weight of the sentence.

14. A method in a computer system for generating a summary of a document, the document having sentences, each sentence having a length, the method comprising:
   providing a weight for each of a plurality of the sentences, the weight indicating importance of the sentence to the document;
   identifying sets of the plurality of sentences, each identified set of the plurality of sentences having a total length less than a maximum length; and
   selecting an identified set of the plurality of sentences, wherein the selected set has a greatest total of the provided weights of all identified sets of sentences;
   wherein the document is one of a plurality of documents, wherein the sentence has component terms, and wherein the providing of the weights of a sentence includes:
      estimating a number of the plurality of documents that contain the sentence based on term frequencies of the component terms, a term frequency of a term being a number of occurrences of that term in a document;
      estimating a total number of times the sentence occurs in the plurality of documents based on the term frequencies of the component terms; and
      combining the estimated number of documents that contain the sentence and the estimated total number of times that the sentence occurs in the plurality of documents to generate the weight for the sentence.

15. A method in a computer system for generating a summary of a document, the document having sentences, each sentence having a length, the method comprising:
   providing a weight for each of a plurality of the sentences, the weight indicating importance of the sentence to the document;
   identifying sets of the plurality of sentences, each identified set of the plurality of sentences having a total length less than a maximum length; and
   selecting an identified set of the plurality of sentences, wherein the selected set has a greatest total of the provided weights of all identified sets of sentences,
   wherein the document is one of a plurality of documents, wherein each document comprises terms, wherein each sentence comprises component terms, and wherein the providing of a weight of a sentence includes:
      for each term, providing a term frequency that represents the number of occurrences of that term in the plurality of documents;
      estimating a document frequency for the sentence based on an estimated sentence probability of the sentence, the document frequency being the number of the plurality of the documents that contain the sentence, the estimated sentence probability being an estimation of the probability that any sentence in documents that contain each component term is the sentence, the sentence probability being derived from term probabilities of the component terms, the term probability of a component term being a ratio of an average of the provided term frequencies for the component terms per document that contains that component term to an average number of terms per document;
      estimating a total sentence frequency for the sentence based on an average sentence frequency for the sentence times the estimated document frequency for the sentence, the average sentence frequency being derived from the sentence probability of the sentence and the average number of terms per document; and
      combining the estimated document frequency with the estimated total sentence frequency to generate the weight of the sentence.

16. A method in a computer system for generating a summary of a document, the document having sentences, each sentence having a length, the method comprising:
   providing a weight for each of a plurality of the sentences, the weight indicating importance of the sentence to the document;

identifying sets of the plurality of sentences, each identified set of the plurality of sentences having a total length less than a maximum length;

selecting an identified set of the plurality of sentences, wherein the selected set has a greatest total of the provided weights of all identified sets of sentences; and creating a summary from the plurality of sentences in the selected set, wherein the document is one of a plurality of documents, wherein the sentence has component terms, and wherein the providing of the weights of a sentence includes:

estimating a number of the plurality of documents that contain the sentence based on term frequencies of the component terms, a term frequency of a term being a number of occurrences of that term in a document;

estimating a total number of times the sentence occurs in the plurality of documents based on the term frequencies of the component terms; and combining the estimated number of documents that contain the sentence and the estimated total number of times that the sentence occurs in the plurality of documents to generate the weight for the sentence.

17. A method in a computer system for generating a summary of a document, the document having sentences, each sentence having a length, the method comprising:

providing a weight for each of a plurality of the sentences, the weight indicating importance of the sentence to the document;

identifying sets of the plurality of sentences, each identified set of the plurality of sentences having a total length less than a maximum length;

selecting an identified set of the plurality of sentences, wherein the selected set has a greatest total of the provided weights of all identified sets of sentences; and creating a summary from the plurality of sentences in the selected set, wherein the document is one of a plurality of documents, wherein each document comprises terms, wherein each sentence comprises component terms, and wherein the providing of a weight of a sentence includes:

for each term, providing a term frequency that represents the number of occurrences of that term in the plurality of documents;

estimating a document frequency for the sentence based on an estimated sentence probability of the sentence, the document frequency being the number of the plurality of the documents that contain the sentence, the estimated sentence probability being an estimation of the probability that any sentence in documents that contain each component term is the sentence, the sentence probability being derived from term probabilities of the component terms, the term probability of a component term being a ratio of an average of the provided term frequencies for the component terms per document that contains the component term to an average number of terms per document;

estimating a total sentence frequency for the sentence based on an average sentence frequency for the sentence times the estimated document frequency for the sentence, the average sentence frequency being derived from the sentence probability of the sentence and the average number of terms per document; and combining the estimated document frequency with the estimated total sentence frequency to generate the weight of the sentence.

18. A computer system for generating a summary of a document, the document having sentences, each sentence having a length, comprising:

a component for calculating a weight for each of a plurality of the sentences;

a component for identifying sets of the plurality of the sentences;

a component for identifying a total length of the plurality of sentences in each identified set;

a component for identifying a total of the provided weights of the plurality of sentences in each identified set;

a component for selecting one of the identified sets of the plurality of the sentences, wherein the selected set has a greatest total of the provided weights of all identified sets having a total length less than a predefined length; and a component for creating a summary from the plurality of the sentences in the selected set.

19. The computer system of claim 18 wherein the sentences are ordered and wherein sentences in the generated summary are ordered in the same relative order as in the document.

20. The computer system of claim 18 wherein the length is measured in number of words.

21. The computer system of claim 18 wherein the length is measured in number of characters.

22. The computer system of claim 18 wherein the generated summary includes an indication of sentences of the document that are omitted from the selected sentences.

23. The computer system of claim 18 wherein the indication of sentences of the document that are omitted is an ellipsis.

24. The computer system of claim 18 wherein the generated summary is stored as a property of the document.

25. The computer system of claim 18 wherein the calculated weights of a sentence are a sum of weights of component terms of the sentence.

26. A computer-readable medium having computer executable instructions stored theron for performing the method recited in claim 1.

27. A computer-readable medium having computer executable instructions stored thereon for performing the method recited in claim 6.

28. A computer-readable medium having computer executable instructions stored thereon for performing the method recited in claim 14.

29. A computer-readable medium having computer executable instructions stored thereon for performing the method recited in claim 16.

30. A computer-readable medium having computer executable instructions stored thereon for performing the method recited in claim 16.

31. A computer-readable medium having computer executable instructions stored thereon for performing the method recited in claim 17.

* * * * *